United States Patent [19]

Zrantchev et al.

[11] Patent Number: 4,663,693

[45] Date of Patent: May 5, 1987

[54] METHOD FOR MAGNETIC STABILIZING OF FLUIDAL LAYERS

[75] Inventors: Ivaylo A. Zrantchev; Todorka F. Popova, both of Sofia, Bulgaria

[73] Assignee: Vish Chimiko-Technologicheski Institute, Sofia, Bulgaria

[21] Appl. No.: 823,583

[22] Filed: Jan. 29, 1986

[30] Foreign Application Priority Data

Jan. 30, 1985 [BG] Bulgaria ................................ 68612

[51] Int. Cl.$^4$ ............................................. H01H 9/00
[52] U.S. Cl. ............................. 361/143; 423/DIG. 16
[58] Field of Search ................. 361/143; 423/DIG. 16

[56] References Cited

U.S. PATENT DOCUMENTS 3,703,958 11/1972 Koln ................................ 361/143 X
4,115,927 9/1978 Rosensweig ............ 423/DIG. 16 X
4,296,080 10/1981 Rosensweig ............ 423/DIG. 16 X Primary Examiner—Michael L. Gellner
Attorney, Agent, or Firm—Karl F. Ross; Herbert Dubno

[57] ABSTRACT

The method for magnetic stabilizing of fluidal layers consists in placing fluidal layers of ferromagnetic particles in a magnetic field that is axially gradient and oriented parallel to the direction of fluidizing. In order to achieve dynamic uniformity of the layer the magnetic field can be oriented colinearly to the direction of fluidizing. For manifold increase in the fluidizing flow the magnetic moment of the particles can be oriented against the direction of the fluidizing flow.

This method can be used in heterogenic and physical processes with fluidal layers of ferromagnetic particles, f.e. catalytic processes, filtration etc.

2 Claims, 1 Drawing Figure

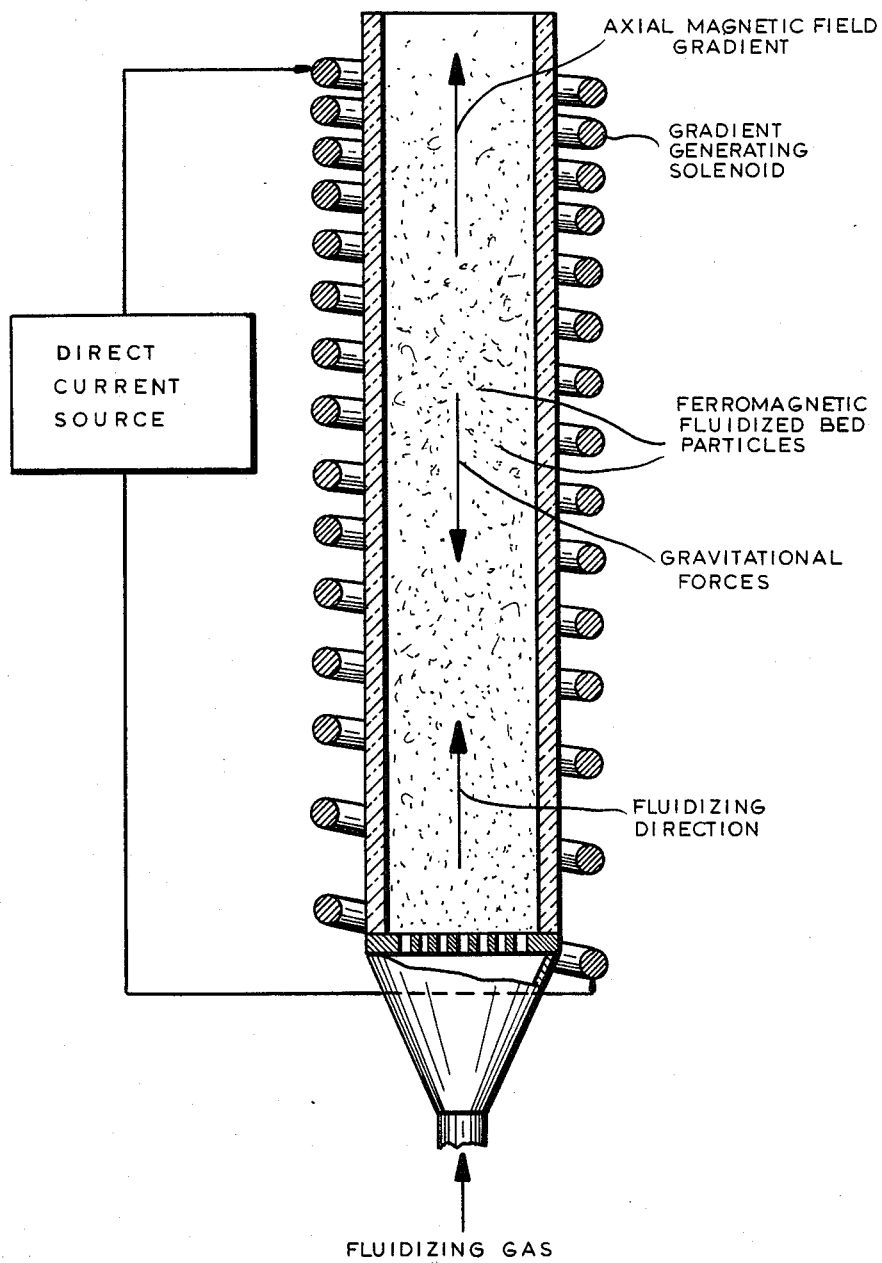

METHOD FOR MAGNETIC STABILIZING OF FLUIDAL LAYERS

The invention refers to a method for magnetic stabilizing of fluidal layers that can be used in heterogenic and physical processes with fluidal layers of ferromagnetic particles, i.e. catalytic processes, filtration, etc.

A method for magnetic stabilizing of fluidal layers is known in which the fluidized and magnetized particles of the layer are placed in the volume of a solenoid creating an uniform magnetic field. The magnetic device forming the magnetic field is disposed around the fluidal layer.

A disadvantage of the known method is that it can be used only with low layers for which the ratio between the layer and the diameter of the apparatus is smaller than 1. The small height of the layer deterioates the gas distribution. The homogenic action of the field can not remove the gradient of the gravity forces with respect to the particles along the height of the layer and no uniform structure can be attained during the stabilisation of the particles. The uniformity of the field depends on the geometric dimensions of the layer and apparatus. This hampers the technological use of the method and limits the linear velocity of the passing fluid.

The object of this invention is to provide a method for magnetic stabilizing of fluidal layers that can be used for high layers independently of the ratio between the layer's height and the apparatus diameter; to eliminate the requirement for axial uniformity of the field; to improve the gas distribution; to eliminate the influence of the gradient of the gravity forces along the layer height and to limit the friction forces between the layer and the walls of the apparatus that is ensuring an uniform structure of the layer.

This object is attained by a method for magnetic stabilizing of fluidal layers in which the fluidal layers of ferromagnetic particles are placed in a magnetic field whereby the magnetic field is axially gradient and is oriented parallel to the direction of fluidizing.

In order to achieve dynamic uniformity of the layer the magnetic field is oriented colinearly to the direction of fluidizing. For multiple increase in the fluidizing flow the magnetic moment of the particles can be oriented against the direction of the fluidizing flow.

The advantage of the method according to the invention are the following: The height of the stabilized layer is increased with respect to same diameter of the apparatus; the difficulties in providing an axial uniformity of the magnetic field are surmounted; the gas distribution along the layer height is improved; the gradients of the gravity forces along the layer length are removed; the friction between the layer and the walls of the apparatus is limited; the axial structure uniformity of the stabilized layer is increased.

The FIGURE shows an embodiment of the invention.

The generating in the particles of gradiently changing magnetic moment that is colinear to the direction of the fluidizing flow provides a dynamic uniformity in the behaviour of the layer. The axial gradient orientation of the magnetic moment neutralizes the longitudinal gradient of the gravity forces. This permits the increase in the layer's height and ensures a reduced resistance from friction with the walls of the apparatus.

The generating in the particles of a gradiently changing magnetic moment against the direction of the fluidizing flow eliminates the axial gradient of the gravity forces and provides the necessary conditions for a manifold increase in the velocity of the fluidizing flow without arising of circulation and bubble forming in the layer.

The following examples illustrate better the substance of the invention however without limiting its scope:

EXAMPLE 1

In a tube with diameter 100 mm are poured ferromagnetic particles with size 60 to 80 microns. The ratio between the height of layer "h" and the diameter of the apparatus "D" is 0.8. The apparatus is placed in the volume of a solenoid that generates a field with gradient $\Delta H$, colinear to the direction of the fluidizing flow. After the velocity for minimal fluidizing are obtained the following values for hydraulic resistance $\Delta P$ and the velocity "V" at which the magnetic stabilizing is perturbed:

| Intensity of magnetic field H, Oe | $\Delta H$ % | $\Delta P$ mm,w. column | Velocity v,m/s | Height of layer,h cm |
|---|---|---|---|---|
| 165 | 35 | 47 | 0,12 | 8,2 |
| 165 | 42 | 53 | 0,20 | 8,9 |
| 165 | 40 | 51 | 0,29 | 9,1 |
| 165 | 40 | 51 | 0,35 | 10,2 |

The value of $\Delta H$ is determined by the difference of H, the value measured between the centre of the solenoid and the centre of the layer. The data indicate that with the increase in $\Delta H$, of $\Delta P$ is relatively constant that is due to the increase in the free volume as a result of expansion of the layer.

EXAMPLE 2

In a tube with diameter "D"=90 mm is poured a layer with height 100 mm. The size of the particles is 60 to 80 microns. The apparatus is disposed in the volume of a solenoid whose gradient is oriented against the direction of the fluidizing flow. The intensity of the magnetic field is 224 Oe. The following values for $\Delta P$, the height of the layer and the velocity "v" have been obtained at which the magnetic stabilizing is perturbed:

| $\Delta H$ % | $\Delta P$ mm w. column | h cm | v m/s |
|---|---|---|---|
| 15 | 57 | 10,2 | 0,32 |
| 30 | 53 | 10,4 | 0,41 |
| 42 | 55 | 10,6 | 0,53 |
| 52 | 54 | 12,2 | 0,56 |
| 60 | 53 | 13,1 | 0,62 |

The change in the values of $\Delta H$ ensures a constancy of the hydraulic resistance $\Delta P$ and an increasing velocity at which the magnetic stabilizing is perturbed. The expansion of the layer is also linked with $\Delta P$.

EXAMPLE 3

In the conditions of examples 1 and 2 is poured a different quantity ferromagnetic material with height of layer "h" that is modified with respect to the diameter of the apparatus "D". The intensity of the magnetic field is 320 Oe. The gradient of the field is generated by different positions of the magnetic device along the height of the layer. Following values for ΔP and "h" are obtained depending on ΔH.

| ΔH % | h = 0,5 D ΔP mm w. cln | h cm | h = D ΔP | h cm | h = 1,5 D ΔP | h cm | h = 2 D ΔP | h cm | h = 2,5 D ΔP | h cm |
|---|---|---|---|---|---|---|---|---|---|---|
| 15 | 27 | 58 | 54 | 120 | 92 | 162 | 112 | 221 | 148 | 272 |
| 30 | 29 | 60 | 56 | 122 | 96 | 170 | 114 | 228 | 150 | 278 |
| 42 | 28 | 60 | 55 | 120 | 90 | 170 | 116 | 230 | 152 | 280 |
| 62 | 27 | 60 | 54 | 121 | 92 | 172 | 112 | 226 | 150 | 280 |
| 60 | 27 | 58 | 54 | 120 | 92 | 173 | 112 | 223 | 150 | 280 |

In increasing the linear velocity and the changing of ΔH, the value of ΔP remains constant due to the eliminating of the gradient forces of gravity without limitations from the height of the layer for the experimental conditions.

EXAMPLE 4

In a convertor for synthesis of ammonia with diameter of the reaction tube 30 mm is poured in a catalyst for ammonia synthesis with particle size of 300–400 microns. The height of the layer is 3.14 times greater than the diameter of the reaction tube. The apparatus is placed in the volume of a solenoid which generates a magnetic field due to the running along the windings of direct current. The disposition of the solenoid along the height of the layer modifies the axial gradient of the field from 0 to 60%. The catalytic process is performed under pressure 10, 20 and 30 MPa and at temperature 500° C. The degree of conversion evaluated after the ammonia content in the converted gas for volumic rate 120,000 h$^{-1}$, linear velocity 0.2 m/c for intensity of the field 125 Oe is the following:

| pressure | 10 MPa | | | 20 MPa | | | 30 MPa | | |
|---|---|---|---|---|---|---|---|---|---|
| ΔH, % | 0 | 30 | 60 | 0 | 30 | 60 | 0 | 30 | 60 |
| vol. % NH$_3$ | 4,95 | 4,85 | 5,30 | 9,45 | 9,65 | 9,40 | 14,4 | 13,89 | 14,40 |

The data show that the modification of the magnetic axial gradient ΔH is not causing a change in the degree of conversion which means that the gradient stabilizing of the layer is not calling forth structure defects and a not effective contact in the catalytic process.

EXAMPLE 5

In a tube of organic glass with diameter 80 mm is poured in a layer with height 100 mm composed of ferromagnetic particles with size 150 to 215 microns. The tube is placed in the volume of the solenoid on the windings of which is running the direct current. The field intensity is 180 Oe. The axial disposition of the solenoid generates a gradient along the height of the layer that attains 100% with respect to the intensity of the magnetic field generating it. After the velocity for minimal fluidizing through the layer is passed polluted air with size of the dust particles up to 25 microns. The degree of dust removal after the layer is 99.4 to 99.9%. The high degree of dust removal is a prove for the structural homogenity of the layer. The increase in the free volume augments the filtering capacity of the gradiently stablized layer.

I claim:
1. Method for magnetic stabilizing of fluidal layers in which the fluidal layers of ferromagnetic particles are placed in a magnetic field, characterized in that the magnetic field is gradient and is oriented parallel to the direction of fluidizing.
2. Method according to claim 1, characterized in that the magnetic field is colinear to the direction of fluidizing.

* * * * *